United States Patent
Itoh et al.

[11] Patent Number: 5,917,108
[45] Date of Patent: Jun. 29, 1999

[54] DRAWING A CHALCOGENIDE GLASS FIBER IN A SULFUR ATMOSPHERE

[75] Inventors: Katsuhisa Itoh; Hiromasa Tawarayama, both of Tokyo, Japan

[73] Assignee: Hoya Corporation, Tokyo, Japan

[21] Appl. No.: 08/994,936

[22] Filed: Dec. 19, 1997

[30] Foreign Application Priority Data

Dec. 25, 1996 [JP] Japan .................................. 8-345157

[51] Int. Cl.⁶ .............................................. C03B 37/027
[52] U.S. Cl. .................. 65/389; 65/424; 65/435
[58] Field of Search ............... 65/389, 379, 435, 65/424

[56] References Cited

U.S. PATENT DOCUMENTS

| | | | |
|---|---|---|---|
| 4,908,053 | 3/1990 | Nishii | 65/389 |
| 5,201,920 | 4/1993 | Schneider | 65/435 |

FOREIGN PATENT DOCUMENTS

| | | | |
|---|---|---|---|
| 0731063 A2 | 9/1996 | European Pat. Off. | |
| 2619561 A1 | 2/1989 | France | |
| 4-77327 | 3/1992 | Japan | 65/389 |

OTHER PUBLICATIONS

Chemical Principles, Dickerson pp. 133 & 145 4th edition, 1984.

Abstract of JP 64–3031 Jun. 1989.

Primary Examiner—John Hoffmann
Attorney, Agent, or Firm—Burns, Doane, Swecker & Mathis, L.L.P.

[57] ABSTRACT

A method for manufacturing a glass fiber includes a process of drawing a starting glass material partially or entirely made of chalcogenide glass or oxychalcogenide glass, such as preform rod, rod-in-tube, or jacketing tube, into a glass fiber in an atmosphere containing sulfur. The concentration of the sulfur in the atmosphere is set at sulfur's vapor pressure or greater around the glass surface at a maximum temperature of the glass fiber while the glass fiber is drawn, thereby fabricating the glass fiber without forming substantially any crystallization on the glass surface.

10 Claims, 1 Drawing Sheet

DRAWING A CHALCOGENIDE GLASS FIBER IN A SULFUR ATMOSPHERE

BACKGROUND OF THE INVENTION

1. Field of the Invention

This invention relates to a method for manufacturing a glass fiber partially or entirely made of chalcogenide glass or oxychalcogenide glass and, more particularly, to a method for manufacturing a glass fiber useful for an optical fiber containing, in a core of the optical fiber, light emitting substances for optical amplification fiber.

2. Description of Related Art

An inexpensive, high efficiency, 1.3-micron-meter band optical amplifier has lately been expected in the art of optical telecommunication. The currently used 1.3-micron-meter band optical amplification medium is an optical fiber containing $Pr^{3+}$ ions as light emitting substances in the core of the fiber. Chalcogenide glass has been used as a host glass to which the $Pr^{3+}$ ions are added. An amplifier with very high efficiency can be fabricated by using the chalcogenide glass.

To obtain an amplifier with higher efficiency, it is desirable to dope more light emitting substances in the core. The chalcogenide glass, however, generally does not solve enough ionic substances serving as the light emitting substances. From this viewpoint, we have paid attentions, as a possible host glass capable of solving more ionic substances, some sulfuric glasses in which sulfur is mainly used as the chalcogen element.

Meanwhile, to use such a glass as an optical amplification medium, the glass is required to be formed into a single mode optical fiber form. Japanese Unexamined Patent Publication (KOKAI) Showa No. 64-3,031 discloses such a method for forming the chalcogenide glass into a fiber. This method is based on a process using a crucible.

Because the method disclosed in Japanese Unexamined Patent Publication Showa No. 64-3,031 is the process using a crucible, a fiber having a core with a diameter of around 15 to 16 micron meters or less, which is particular to a single mode fiber, is hardly fabricated. A general method to fabricate a single mode fiber is to form a preform with a large ratio of a clad diameter to a core diameter by a method of a rod-in-tube, extrusion, etc., and then to draw the preform into a fiber in applying heat to a part of the preform to soften the preform.

The chalcogenide glass, however, is less stable, thereby rendering actually impossible formation of an optical fiber in use of the conventional preform method as it is. Under this circumstance, we have tried some single mode fiber fabrications from a sulfuric chalcogenide capable of containing more light emitting substances in use of the preform method.

The preform method, however, volatilizes the chalcogen element such as sulfur from a side face of a preform rod or jacketing tube that is directly exposed to the gas phase atmosphere during drawing. The sulfuric chalcogenide particularly experienced remarkable sulfuric volatilization. If the chalcogen element such as sulfur volatilizes, a surface composition of the preform rod or jacketing tube may shift from an inner composition. Sulfuric metallic chalcogenide glass has a narrower range for forming glass than arsenic-sulfuric glass and is less stable against crystallization. If chalcogen element such as sulfur excessively volatilizes from the surface of the preform rod or jacketing tube, this volatilization induces composition shifts or metamorphosis on the surface, thereby likely causing surface crystallization. In fact, the fiber lost the fiber's strength due to crystal depositions. In some occasions, the glass cannot be even drawn due to significant surface crystallization.

SUMMARY OF THE INVENTION

It is an object of the invention to provide a method for manufacturing a glass fiber by drawing a starting glass material partially or entirely made of chalcogenide glass or oxychalcogenide glass without surface crystallization.

In one form of the invention, a method for manufacturing a glass fiber by drawing a starting glass material partially or entirely made of chalcogenide glass or oxychalcogenide glass, comprises a step of drawing the starting glass material into a glass fiber in an atmosphere containing sulfur where a concentration of sulfur in the atmosphere is set at a vapor pressure of sulfur or greater around the surface of the glass fiber at a maximum temperature of the glass fiber during drawing.

The atmosphere may contain a hydrogen sulfide or a mixture of a hydrogen sulfide and an oxidizing gas. The hydrogen sulfide heated at 400 Celsius degrees can be introduced as the atmosphere. The atmosphere may further contain an inert gas. The starting glass material may be a preform rod, rod-in-tube, or jacketing tube and may include a core containing light emitting substances.

BRIEF DESCRIPTION OF THE DRAWING

The above and other objects and features of the invention are apparent to those skilled in the art from the following preferred embodiments thereof when considered in conjunction with the accompanied drawings, in which.

DESCRIPTION OF PREFERRED EMBODIMENTS

Figure 1:
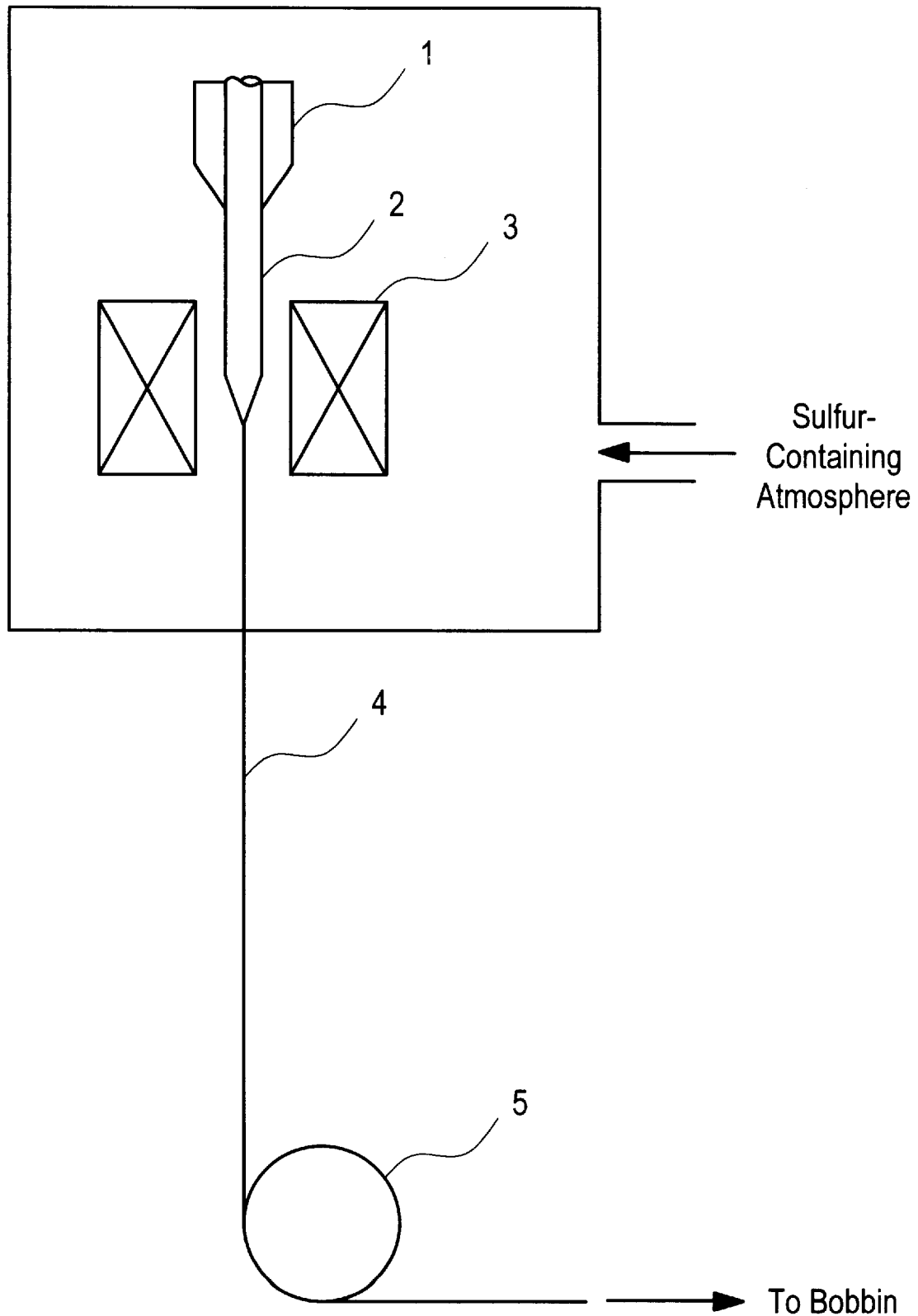
FIG. 1 is an illustration showing a drawing apparatus for an optical fiber implementing a manufacturing method according to the invention.

A starting glass material used in a manufacturing method according to the invention is made of partially or entirely made of chalcogenide glass or oxychalcogenide glass. The chalcogenide glass and oxychalcogenide glass are sulfuric glasses in which ionic substances are highly soluble. The chalcogenide glass is expressed by a general formula: $A^{3+}$-$D^{2+}$-$E^{+}$-S, wherein A denotes one or more elements selected from Ga, Al, and In; D denotes one or more elements selected from Cd, Ca, Sr, Ba, Pb, Zn and Hg; and E denotes one or more elements selected from Li, Na, K, Co, Rb and Ti. More specifically, exemplified as a chalcogenide glass are Ga-Na-S, Ga-Na-Cd-S, Ga-Ge-S, Ga-La-S, B-Na-S, Ga-Ge-La-S, Al-La-S, Ge-Na-S, etc. The oxychalcogenide glass is a glass that the chalcogenide glass further contains oxygen, and exemplified are glasses, e.g., Ga-Na-S-O, Ga-La-S-O, Ga-Ge-La-S-O, Al-La-S-O, etc.

With the manufacturing method according to the invention, a conventional structure of and manufacturing method for a starting glass material, which is partially or entirely made of chalcogenide glass or oxychalcogenide glass, and a conventional apparatus and conditions used for drawing the starting glass material are useful as they are. As a starting glass material, exemplified are, e.g., a preform rod, a rod-in-tube, a jacketing tube, etc. The preform rod is a rod in which a core glass and a cladding glass are formed in a united body. The rod-in-tube is that a core glass rod is inserted in a hollow of a cladding glass tube and that the core and cladding glasses are made in a united body during drawing though not yet at a stage of the starting glass material. The jacketing tube is that a preform rod is inserted in a hollow of a jacketing tube and that the preform rod and the jacketing tube are made in a united body during drawing though not yet at a stage of the starting glass material.

The starting glass material can be fabricated into a glass fiber by drawing the starting glass material in applying heat to soften the material. More specifically, a part of the starting glass material can be so drawn in applying heat that the glass viscosity becomes, e.g., $1 \times 10^5$ to $1 \times 10^8$ poises.

The drawing process in the method according to the invention is implemented under an atmosphere containing sulfur of a concentration of sulfur's vapor pressure or greater around a glass surface at glass' maximum temperature during the drawing process. Sulfur's volatilization speed from the glass surface becomes slower, and sulfur becomes less volatile, as the sulfur's vapor pressure in the gas phase in contact with the glass surface becomes higher. Accordingly, if the sulfur's vapor pressure in the atmosphere is controlled to be the sulfur's vapor pressure around the glass surface at the maximum temperature that the starting glass material receives during the drawing, sulfur's volatilization from the glass surface can be substantially reduced. Although there would be no upper limit in the sulfur's vapor pressure, it would be unnecessary to make the sulfur's vapor pressure excessively high to suppress sulfur's volatilization, and if the sulfur's vapor pressure becomes too high, handling of the atmosphere would become harder to that extent. Therefore, an appropriate pressure of sulfur in the atmosphere would, in a practical sense, be equal to or greater than the sulfur's vapor pressure as well as close to the sulfur's vapor pressure.

As a source of sulfur, sulfur itself and a sulfuric compound, such as hydrogen sulfide, containing sulfur to create sulfur upon decomposition can be used. From a viewpoint to control sulfur's vapor pressure (concentration) in the atmosphere, it is desirable to use sulfur or hydrogen sulfide. When sulfur is used, the vapor pressure of sulfur (concentration) in the atmosphere can be controlled by properly diluting sulfur with an inert gas or gases or the like in consideration of the maximum temperature that the preform receives during drawing. A sulfuric vapor (gas) of 0.01 to 100% or a mixture gas of a sulfuric vapor (gas) and an inert gas such as a rare gas and a nitrogen gas can be used.

When a hydrogen sulfide is used, the concentration of the hydrogen sulfide to be supplied is controlled in consideration of the maximum temperature that the preform receives during drawing, because the hydrogen sulfide is thermally decomposed at and above about 400 degrees Celsius and provides a vapor pressure of sulfur according to the temperature. The sulfur's vapor pressure (concentration) can be therefore controlled to a desired value in the atmosphere. That is, the concentration of hydrogen sulfide to be supplied to the atmosphere can be determined in the light of temperature. A hydrogen sulfide gas of, e.g.,0.01 to 100% or a mixture gas of a hydrogen sulfide and an inert gas such as a rare gas and a nitrogen gas can be used. Moreover, a mixture gas of hydrogen sulfide, sulfur, and an inert gas can be used as an atmosphere gas. When hydrogen sulfide is used or mixed in the atmosphere, it is preferable to decompose a part of the hydrogen sulfide by increasing the part to a temperature of 400 degrees Celsius or greater in advance.

When hydrogen sulfide is used or mixed as a sulfur source, an oxidizing gas can be added together with the hydrogen sulfide for the purpose of promotion of sulfur supply by decomposition of the hydrogen sulfide and traps of hydrogen produced by the decomposition. The hydrogen gas indicates strong reducibility and may crystallize the glass. As an oxidizing gas, exemplified are, e.g., oxygen, sulfur dioxide, sulfur trioxide, $POCl_3$, $SOCl_3$, halogen gases, sulfur hexafluoride, nitrogen dioxide, nitrogen monoxide, etc. It is appropriate to set the oxidizing gas to be 50 percent or less of the gas supply.

A hydrogen sulfide gas, even if solely used, can continue to supply sulfur element onto the glass surface by reacting with the glass surface or being decomposed around the glass surface in a way as shown in the following formula: $H_2S \rightarrow H_2 + S$.

According to glass species, however, strong reduction power of hydrogen produced by the reaction above reduces metal ions having easily reducible property among glass constituting elements. As a result, the glass may rapidly lose the stability against crystallization due to changes of glass constituting ions, thereby possibly causing crystallization. To solve this problem, it is preferred to render the atmosphere gas coexist with the oxidizing gas, as described above, thereby rendering the hydrogen an inert compound such as water.

Since the concentration of sulfur in the atmosphere is set to sulfur's vapor pressure or greater around the glass surface at the maximum temperature of the glass during the drawing, this invention can suppress volatilization of sulfur element from the glass surface of the preform rod or jacketing tube. Therefore, composition shifts otherwise induced due to volatilization of sulfur element, will be prevented, so that a glass fiber can be fabricated without deposition of crystals on the glass surface.

Some glass species do not reach a temperature such that hydrogen sulfide is decomposed to sufficiently supply sulfur element, or in other words, some glass species have a relatively low drawing temperature. For those glasses, it is desirable to premix the atmosphere gas with oxidizing gas capable of oxidizing hydrogen sulfide at around ordinary temperature, e.g., sulfur dioxide or the like, or to sufficiently decompose hydrogen sulfide by heating the hydrogen sulfide itself in advance. An appropriate oxidizing gas such as sulfur dioxide has a concentration of 100 ppm to 50 mole percent (the same amount as hydrogen sulfide). When a hydrogen sulfide itself is preheated to be decomposed, the temperature is 400 degrees Celsius or greater.

The invented manufacturing method can be implemented with a furnace at least capable of controlling an inside atmosphere and an apparatus basically having a mechanism to extract the glass softened by heat. For example, as shown in FIG. 1, a drawing furnace 3 applies heat to a tip of a preform 2 mounted on a preform chuck 1. A capstan 5 draws an optical fiber 4 from the tip of the preform 2, and the drawn optical fiber 4 is taken up by a bobbin, not shown, thereby forming the optical fiber 4. Though not shown, the drawing furnace 3 has a structure capable of controlling the inside atmosphere.

EXAMPLES

Hereinafter, this invention will be described based on Examples.

Example 1

A core-clad united body type preform rod made of sulfuric chalcogenide glass having a clad composition of 67 mole percent $Ga_2S_3$ and 33 mole percent $Na_2S$ and an outer diameter of 6 millimeters, was fabricated by an extrusion molding method. The preform rod was then set in a drawing furnace capable of controlling the atmosphere, and a nitrogen gas containing hydrogen sulfide of 10 percent by volume ratio was flown from a top of the preform at a flow rate of 0.5 liter per minute. Where the drawing furnace was heated to draw the preform into a fiber at about temperature of 545 degrees Celsius while the mixture gas was continuously flown, a fiber was drawn without forming any crystallization on the surface.

It is to be noted that where a preform rod for a chalcogenide glass fiber having the same composition as the above Example was drawn into a fiber in an atmosphere solely consisted of nitrogen, the surface of the drawn fiber was formed with significant crystallization, which rendered the drawn fiber substandard.

Example 2

A sulfuric chalcogenide glass tube having a glass composition of 65 mole percent $Ga_2S_3$ and 35 mole percent $Na_2S$ and an outer diameter of 10 millimeters and an inner diameter of 7 millimeters, was fabricated by a rotational casting method, and the outside surface was polished anhydrously and etched. A core rod made of sulfuric chalcogenide glass having a glass composition of 67 mole percent $Ga_2S_3$ and 33 mole percent $Na_2S$ and an outer diameter of 6.8 millimeters was fabricated by a casting method, and the outside surface was polished anhydrously and etched. This core rod was inserted in the tube. The obtained rod-in-tube was mounted in a drawing furnace capable of controlling atmosphere. A nitrogen gas containing hydrogen sulfide of 20 percent by volume ratio was introduced from a top of the combination of the rod and tube at a flow rate of 0.5 liter per minute. Where the drawing furnace was heated to draw the preform into a fiber at about temperature of 545 degrees Celsius while the mixture gas was continuously flown, a fiber was drawn without forming any crystallization on the surface.

It is to be noted that where a rod-in-tube substantially the same as this Example was drawn in an atmosphere solely consisted of nitrogen, the surface of the drawn fiber was formed with significant crystallization, which rendered the drawn fiber substandard.

Example 3

A core-clad united body type preform rod made of sulfuric chalcogenide glass having a clad composition of 70 mole percent $Ga_2S_3$ and 30 mole percent $La_2S$ and an outer diameter of 6 millimeters, was fabricated by an extrusion molding method. The preform rod was then set in a drawing furnace capable of controlling the atmosphere. A nitrogen gas containing hydrogen sulfide of 20 percent by volume ratio and a nitrogen gas containing sulfur dioxide of 1 percent by volume ratio were mixed at a ratio of 1 to 1 right over the preform, and the mixture gas was flown at a flow rate of one liter per minute. Where the drawing furnace was heated to draw the preform into a fiber at about temperature of 660 degrees Celsius while the mixture gas was continuously flown, a fiber was drawn without forming any crystallization on the surface.

It is to be noted that where a preform rod for a chalcogenide glass fiber having the same composition as this Example was drawn into a fiber in an atmosphere solely consisted of nitrogen, the surface of the drawn fiber was formed with significant crystallization, which rendered the drawn fiber substandard.

Example 4

A core-clad united body type preform rod made of sulfuric chalcogenide glass having a clad composition of 5 mole percent Ga, 25 mole percent Ge, and 70 mole percent S and an outer diameter of 6 millimeters, was fabricated by an extrusion molding method. The preform rod was then set in a drawing furnace capable of controlling the atmosphere. A nitrogen gas containing hydrogen sulfide of 50 percent by volume ratio and a nitrogen gas containing sulfur dioxide of 10 percent by volume ratio were mixed at a ratio of 1 to 1 right over the preform, and the mixture gas was flown at a flow rate of one liter per minute. Where the drawing furnace was heated to draw the preform into a fiber at about temperature of 475 degrees Celsius while the mixture gas was continuously flown, a fiber was drawn without forming any crystallization on the surface.

It is to be noted that where a preform rod for a chalcogenide glass fiber having the same composition as this Example was drawn into a fiber in an atmosphere solely consisted of nitrogen, the surface of the drawn fiber was formed with significant crystallization, which rendered the drawn fiber substandard.

Example 5

A core-clad united body type preform rod made of sulfuric oxychalcogenide glass having a clad composition of 64 mole percent $Ga_2S_3$, 3 mole percent $Ga_2O_3$, and 33 mole percent $Na_2S$ and an outer diameter of 6 millimeters, was fabricated by an extrusion molding method. The preform rod was then set in a drawing furnace capable of controlling the atmosphere. A nitrogen gas containing hydrogen sulfide of 10 percent by volume ratio was flown from a top of the preform at a flow rate of 0.5 liter per minute. Where the drawing furnace was heated to draw the preform into a fiber at about temperature of 550 degrees Celsius while the mixture gas was continuously flown, a fiber was drawn without forming any crystallization on the surface.

It is to be noted that where a preform rod for a chalcogenide glass fiber having the same composition as this Example was drawn into a fiber in an atmosphere solely consisted of nitrogen, the surface of the drawn fiber was formed with significant crystallization, which rendered the drawn fiber substandard.

Example 6

A core-clad united body type preform rod made of sulfuric oxychalcogenide glass having a clad composition of 64 mole percent $Ga_2S_3$, 32 mole percent $Na_2S$, and 4 mole percent CdS and an outer diameter of 6 millimeters, was fabricated by an extrusion molding method. The preform rod was then set in a drawing furnace capable of controlling the atmosphere. A nitrogen gas containing hydrogen sulfide of 50 percent by volume ratio and a nitrogen gas containing sulfur oxide of 10 percent by volume ratio were mixed at a ratio of 1 to 1 right over the preform, and the mixture gas was flown at a flow rate of one liter per minute. Where the drawing furnace was heated to draw the preform into a fiber at about temperature of 535 degrees Celsius while the mixture gas was continuously flown, a fiber was drawn without forming any crystallization on the surface.

It is to be noted that where a preform rod for a chalcogenide glass fiber having the same composition as this Example was drawn into a fiber in an atmosphere solely consisted of nitrogen, the surface of the drawn fiber was formed with significant crystallization, which rendered the drawn fiber substandard.

Example 7

A core-clad united body type preform rod made of sulfuric chalcogenide glass having a clad composition of 67 mole percent $Ga_2S_3$ and 33 mole percent $Na_2S$ and an outer diameter of 6 millimeters, was fabricated by an extrusion molding method, and the fabricated rod was etched. The obtained preform rod was then set in a drawing furnace capable of controlling the atmosphere. A nitrogen gas heated at about 450 degrees Celsius containing sulfur of about 50 percent evaporated by an evaporator was introduced from an exact top of a heater of the drawing furnace that has already heated at a temperature of 450 degrees Celsius or greater. Subsequently, the nitrogen gas flown from the top of the atmosphere furnace and the mixture gas containing sulfur were merged, and consequently, a mixture gas containing 20 percent sulfur was flown. The preform was drawn into a fiber at about 545 degrees Celsius while the mixture gas containing 20 percent sulfur was continuously flown, thereby fabricating a fiber without forming any crystallization on the surface.

It is to be noted that where a preform rod for a chalcogenide glass fiber having the same composition as this Example was drawn into a fiber in an atmosphere solely consisted of nitrogen, the surface of the drawn fiber was formed with significant crystallization, which rendered the drawn fiber substandard.

According to the invention, chalcogenide glass and oxychalcogenide glass, particularly sulfur glasses in which ionic substances are highly soluble, are prevented from volatilizing chalcogen element out of a starting glass material such as a preform or tube made of those glasses, so that a fiber can be fabricated without forming crystallization on the surface of those glasses by eliminating composition shifts or metamorphism on the surface of those glasses. A fiber can be formed even from a material having a glass composition that so far has been unable to form a fiber due to large volatilization out of the glass surface at a drawing temperature, and this invented method, therefore, can facilitate wide exploration of glass compositions having high light emitting efficiency of lasing active materials and a low loss.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A method for manufacturing a glass fiber by drawing a starting glass material into the glass fiber, the method comprising the steps of:

preparing a starting glass material partially or entirely made of chalcogenide glass or oxychalcogenide glass; and drawing the starting glass material in an atmosphere containing sulfur into a glass fiber.

2. The method according to claim 1, wherein the atmosphere comprises a hydrogen sulfide.

3. The method according to claim 2, wherein the atmosphere comprises the hydrogen sulfide and an oxidizing gas.

4. The method according to claim 3, wherein the atmosphere contains an inert gas.

5. The method according to claim 3, wherein the hydrogen sulfide is 400 Celsius degrees or higher.

6. The method according to claim 2, wherein the hydrogen sulfide is 400 Celsius degrees or higher.

7. The method according to claim 2, wherein the atmosphere contains an inert gas.

8. The method according to claim 1, wherein the atmosphere contains an inert gas.

9. The method according to claim 1, wherein the starting glass material is a preform rod, rod-in-tube, or jacketing tube.

10. The method according to claim 1, wherein the starting glass material includes a core containing praseodymium.

* * * * *